United States Patent [19]

Proske et al.

[11] Patent Number: 5,615,992

[45] Date of Patent: Apr. 1, 1997

[54] METHOD STORING OR RESTACKING GOODS CARRIERS IN MULTI-STORIED WAREHOUSE

[75] Inventors: Hans Proske, Reinheim; Volker Treib, Brensbach; Horst Wuttke, Weiterstadt, all of Germany

[73] Assignee: Carl Schenck AG, Darmstadt, Germany

[21] Appl. No.: 340,214

[22] Filed: Nov. 16, 1994

[30] Foreign Application Priority Data

Nov. 24, 1993 [EP] European Pat. Off. .............. 93118861

[51] Int. Cl.⁶ .................................................. B65G 1/04
[52] U.S. Cl. .......................... 414/786; 414/278; 414/282; 414/283
[58] Field of Search ..................... 414/277, 278, 414/281–283, 756, 254, 260

[56] References Cited

U.S. PATENT DOCUMENTS

| | | | |
|---|---|---|---|
| 493,542 | 3/1893 | Bessing et al. | 414/282 X |
| 2,647,647 | 8/1953 | Alimanestiano | 414/254 |
| 3,232,455 | 2/1966 | Fountain et al. | 414/282 |
| 3,664,534 | 5/1972 | Hunter | 414/278 X |
| 3,719,295 | 3/1973 | Grace | 414/635 |
| 3,782,565 | 1/1974 | Doran et al. | 414/281 X |
| 3,792,785 | 2/1974 | Weir | 414/278 |
| 3,921,828 | 11/1975 | Suizu | 414/281 X |
| 4,014,442 | 3/1977 | Adelson et al. | 414/254 X |
| 4,534,692 | 8/1985 | Shiomi et al. | 414/282 |
| 4,566,838 | 1/1986 | Binning et al. | 414/278 |
| 5,116,182 | 5/1992 | Lin | 414/282 X |
| 5,330,305 | 7/1994 | Go | 414/254 |
| 5,366,335 | 11/1994 | Tokiwa | 414/282 |
| 5,456,562 | 10/1995 | Schlecker et al. | 414/254 |
| 5,460,475 | 10/1995 | Lloyd et al. | 414/282 X |

FOREIGN PATENT DOCUMENTS

| | | |
|---|---|---|
| 0029073 | 5/1981 | European Pat. Off. . |
| 0133472 | 2/1985 | European Pat. Off. . |
| 1957753 | 5/1971 | Germany . |
| 2407756 | 8/1975 | Germany .............................. 414/278 |
| 3207860 | 9/1982 | Germany . |
| 2839496 | 1/1983 | Germany . |
| 17703 | 1/1989 | Japan ..................................... 414/278 |
| 331098 | 8/1958 | Switzerland . |
| 1197518 | 7/1970 | United Kingdom . |
| 1207146 | 9/1970 | United Kingdom . |

*Primary Examiner*—David A. Bucci
*Attorney, Agent, or Firm*—W. G. Fasse; W. F. Fasse

[57] ABSTRACT

A method and an apparatus are particularly suitable for storing, unstoring, or relocating goods carriers of various dimensions, such as loaded or empty freight containers, in a multi-storied storage facility. The storage facility includes a storage rack having several storage levels with several storage locations or compartments on each storage level. A storage conveyor device is horizontally and vertically movable along the storage rack to carry a freight container to a selected storage compartment on a selected storage level. Depending on the dimensions of the freight container, and whether several containers are to be stored in a single storage compartment, each container can be deposited at a particular position within the storage compartment. The particular final position of each container within the storage compartment can be predetermined. Each container is first prepositioned at a preliminary position on the conveyor device corresponding to the preselected final position at which the container is to be deposited within the storage compartment. Then, the goods conveyor deposits the container at the preselected final position within the preselected storage compartment.

18 Claims, 6 Drawing Sheets

METHOD STORING OR RESTACKING GOODS CARRIERS IN MULTI-STORIED WAREHOUSE

FIELD OF THE INVENTION

The invention relates to a method of storing, removing from storage, and relocating various sized goods carriers, such as loaded or empty freight containers, in selected storage locations in a storage rack of a multi-storied storage facility, such as a warehouse. The method of the invention can be carried out by a corresponding apparatus, which generally includes a conveying device that moves along an alleyway provided alongside at least one storage rack having a plurality of storage levels. The conveying device includes a platform that is vertically drivable along a mast, which is supported on a carriage that is drivable in a horizontal direction along rails provided in the alleyway. Such a storage facility generally further includes a transfer station for transferring the goods carriers to the storage rack conveying device or from the storage rack conveying device to other conveyors, at least one end of the facility.

BACKGROUND INFORMATION

German Patent 2,839,496 C2 discloses a method of transferring conveyed goods from a driven roller conveyor that is movable along a rail, whereby the conveying direction is perpendicular to its moving direction, to a storage location embodied as a conveyor drivable through frictional contact. The rail-mounted, driven roller conveyor is moved in a direction parallel to its conveying direction until frictional contact is established with the drivable roller conveyor forming the storage location.

An apparatus for carrying out the method disclosed in German Patent 2,839,496 C2 includes a driven roller conveyor mounted on a rail carriage, a friction roller drive train, a drive mechanism for the driven roller conveyor, and a drivable roller conveyor forming the storage location. The apparatus further includes another drive mechanism arranged between the driven roller conveyor and the rail carriage, which may, for example, be a spindle drive or a chain drive. The driven roller conveyor is supported on guides, such as guide rollers or rail members, extending perpendicularly to the movement direction. The additional drive mechanism pushes the driven roller conveyor forward until the friction wheel comes into contact, at a predeterminable contact pressure, with a frictional tread surface of the drivable roller conveyor.

In the above described known method and apparatus, it is necessary that both the loading arrangement, as well as the storage arrangement are provided with rollers. It is clear that the cost and effort involved in equipping such a storage facility with rollers forming the compartment floor of each individual storage compartment is quite high, and becomes prohibitive for manufacturing a multi-storied warehouse including a multi-storied storage rack having such a construction. Furthermore, the maintenance cost and effort are also very high for such an arrangement. Furthermore, with such an arrangement it is necessary to attach an additional lift or hoist to the multi-storied facility, and additionally provide a roller conveyor of the above described type in each warehouse aisle for loading or inserting goods into the individual storage compartments of the storage racks. Moreover, it is only possible to relocate or restack goods from one storage location to another storage location within the multi-storied storage facility through a series of temporary, intermediate placements of the goods. European Patent Application 0,133,472 discloses a high-rise multi-storied storage facility in which an incoming piece of freight, for example a freight container, is first delivered by an auxiliary apparatus, namely a lift or hoist. Then, the freight is delivered to a particular storage level, where it is transferred to or taken over by a further auxiliary vehicle. The auxiliary vehicle then carries the freight in the individual aisles of the storage rack to a position in front of the appropriate storage location, and then deposits the freight at the storage location by means of a raising and lowering movement. With such an arrangement, it is only possible to carry out a simple storing and unstoring or removing of containers.

German Patent Laying Open Document 3,207,860 A1 discloses a conveyor device for a multi-storied warehouse, in which a lift or hoist lifts large containers up to the individual floors of the warehouse. At each individual floor, the containers are further handled by an additional conveying device. The conveying device includes additional raisable and lowerable conveyor carriages, each including its own drive means. Each conveyor carriage receives either one large container or two smaller containers and then drives through an alley to bring the containers to the appropriate compartment of a storage rack. An auxiliary wagon moves the container or containers into the compartment. The wagon is lowered to deposit the container(s) and is then retracted onto the carriage that drives in the alley. Thereupon, a new storage cycle can be initiated, whether it is to place a container into a storage compartment or to remove a container from a storage compartment. It is possible to relocate individual containers only by the repeated, temporary placement of the containers at intermediate storage locations, until the containers are finally deposited at the desired storage location, for example where a new batch load of several containers is being assembled.

The use of additional lift or hoist means necessarily involves an additional conveying step during the storing or unstoring procedure. Thereby, the storing or unstoring cycle necessarily requires a longer time to be completed. Furthermore, if containers are to be relocated or restacked within one floor or storage level of the warehouse, the lift is blocked during the time period necessary for the relocation. In other words, additional containers to arrive at or depart from this storage level cannot be transported. When containers are to be relocated from one storage level to another, the lift is also occupied or blocked from receiving or releasing other containers, because the lift is needed as an auxiliary device for carrying out the relocation.

The same concerns or disadvantages described above apply when transporting and storing large pallets or large individual work pieces, which themselves have a sufficient strength to be conveyed into the intended storage location in a multi-storied storage rack without being placed into a container or other supporting arrangement.

Furthermore, the above described methods and apparatus cannot be used to select, in advance, a desired arbitrary storage location for goods that are to be stored either semi-permanently at a final location or temporarily at an intermediate location.

OBJECTS OF THE INVENTION

In view of the above it is the aim of the invention to achieve the following objects singly or in combination:

to provide a method and apparatus for storing, unstoring, or relocating goods carriers of various dimensions, especially such as loaded or empty freight containers, in a multi-storied storage facility, wherein it is possible to preselect the final storage position of the goods carrier within a storage rack of the facility;

to avoid the need of providing rollers on the compartment floor of each individual storage compartment of a storage rack in such a storage facility;

to avoid the need of providing a separate lift or hoist in such a storage facility, by providing a conveying device that is self-sufficient and complete with all necessary systems for carrying out the entire procedure of storing, unstoring or relocating goods carriers within a storage rack of such a facility;

to allow goods containers to be relocated among storage locations on the same storage level or on different storage levels by a direct relocation, without first being temporarily deposited at an intermediate or transfer location;

to allow freight containers of different sizes to be placed at particular preselected positions within each storage location, depending on the size of the respective container and depending on whether it is intended to store additional containers at the same storage location;

to preestablish a position of a container on the conveying device, which corresponds to the final intended position of the container within the storage location;

to carry out the positioning of the container on the conveying device during the movement of the conveying device to a selected storage location or during the extension of the conveying device into the selected storage location, so as to reduce the total required cycle time; and to avoid the need of container size limit stops or alarm limit switches arranged within the storage locations, by predetermining the dimensions of a container and precisely positioning the container within a storage location to avoid protrusion of the container beyond the allowable storage space.

SUMMARY OF THE INVENTION

The above objects have been achieved by the method and apparatus of the present invention. According to the present method, the conveyor device is first moved so that a support member of the conveyor device, which carries the goods carrier, is aligned with a selected target storage location. The goods carrier is positioned into a preliminary position on the support member, which corresponds to a final selected target position in which the goods carrier is to be placed in the selected target storage location. The support member of the conveyor device is moved into the selected target storage location and then the goods carrier is deposited at the final selected position in the selected target storage location. Finally, the support member is withdrawn from the selected target storage location.

In this manner it possible to use all of the free or unoccupied storage space in the storage rack during the mixed delivery of large, medium and small containers, for example, while unloading containers from an aircraft. Furthermore, while unstoring or removing containers from storage, it is possible to place several small containers sequentially onto the conveyor device by correspondingly repositioning the first-removed container on the conveyor device to make room for additional containers, while the conveyor device is being moved toward the exit or transfer location to remove the containers from storage. In this manner, it is possible to deliver a batch of containers in a prescribed conveyed order at the exit of a high rise or underground multi-storied storage facility. Thereupon, the batch load of containers can be delivered to a further conveying arrangement or loaded directly into a truck or a conveyor leading to a freighter aircraft, for example. This can be achieved without time delays and intermittent blocking of the loading apparatus while it carries out the necessary relocation or rearrangement of containers.

Furthermore, it is possible during a single unstoring cycle, first to deliver freight containers directly to an aircraft through a so-called nose dock, and then to simply move the conveying device further, without any resorting or relocating of containers, to a ground floor to load additional containers onto a truck or to receive containers from a truck, for example. The containers loaded onto the storage rack conveyor device from the truck may then be stored, as desired, either in the high rise multi-storied storage rack or in the underground multi-storied storage rack by means of properly driving and controlling the storage rack conveyor device.

According to a further particular detail of the present method, when relocating a container from a first storage compartment into a different, destination storage compartment within a highrise or underground multi-storied storage rack, the position of the container on the conveyor device established when the container is picked up from the first storage location can simply be maintained if that position corresponds with the final desired position of the container within the destination storage compartment. Alternatively, if the starting position of the container does not correspond to the final intended position, then the container is moved to a new position on the conveyor device before the container is deposited at the final selected position within the destination storage compartment. In this manner, it is no longer necessary to repeatedly pick up and deposit the container at a series of temporary, intermediate locations in order to change the position of the goods carrier between a source storage compartment and a target storage compartment. Furthermore, this feature of the present method makes it possible to store smaller containers at a preselected position within a storage compartment or storage location of a storage rack comprising a simple steel rack construction, without special auxiliary locating mechanisms arranged in each storage compartment for establishing intermediate positions. Any container can be accurately positioned as desired within a storage compartment, for example, at any desired intermediate position within the storage compartment, by appropriately activating and controlling the conveyor device according to the invention.

It is further provided according to the invention, that the desired positioning of the goods carrier or container on the conveyor device can be carried out while the conveyor device is being moved to the selected storage location, for example while the conveyor carriage is moving along rails provided in the running or transfer alley. By positioning the container on the conveyor device while the conveyor device moves along the alleyway, the total cycle time necessary for storing or unstoring or relocating a container in the multi-storied storage rack is considerably reduced.

According to another detail embodiment of the method of the invention, the proper positioning of the container on the conveyor device is carried out while the conveyor device moves into the selected storage compartment or storage location to finally deposit the container at the selected position within the storage location. According to such a method, two superimposed movements are carried out by the conveyor device substantially simultaneously. For example, the conveyor device moves a large container into a selected storage compartment and simultaneously carries out another movement which is superimposed on the general movement of the container into the storage compartment. The second, superimposed movement makes it possible to move the entire length of the large container into the storage compartment without requiring extra free space and without requiring a conveyor device of correspondingly large size. This further assures that the rear portion of the large container does not protrude from the storage compartment into the alleyway of the storage facility.

In this manner, the conveying device and also the entire highrise or underground storage rack can be constructed in an especially compact manner, which increases the safety or security of such storage arrangements. Furthermore, in this manner it is achieved that the storage rack can use quite simple storage compartments, which have a depth corresponding exactly to the length of the largest container to be stored, and which do not require any additional auxiliary components or end stop members, for example, which might otherwise be used to trigger an alarm if a container exceeds the prescribed storage space contours within the storage compartment. According to the invention, the dimensions of each container to be stored are already predetermined, for example, by measuring the dimensions of a container when it is transferred onto the conveyor device. Then, the premeasured dimensions of the container can be compared to the known dimensions of the selected storage location, and the conveyor device can properly position the container to achieve the optimum storage arrangement.

The apparatus for carrying out the present method generally includes at least one storage rack having a plurality of storage locations or storage compartments for storing goods carriers, such as freight containers, therein. A running or transfer alleyway is provided along one side of the storage rack, or between two storage racks. The conveyor device includes a table or platform vertically movably arranged on a mast attached to a carriage, which moves horizontally along rails provided in the transfer alley. The multi-storied warehouse in which the storage rack is arranged includes a transfer station at least at one end, at which goods carriers can be transferred to the storage rack conveyor device from other conveyor devices or vice versa.

More particularly in the apparatus of the invention, a roller table is arranged and supported on the table or platform of the conveyor device by at least two running roller sets. The roller table is drivable and stoppable in a controlled manner by a controller unit provided on the conveyor device. The running roller sets of the roller table are also drivable and stoppable by the conveyor device, and cooperate with or engage support strips provided in each storage compartment when the roller table is extended from the conveyor platform into the storage compartment for storing, unstoring, or relocating a goods carrier in the storage compartment. The roller table is raisable and lowerable relative to the table and relative to the support strips.

By means of this arrangement according to the invention, of the drivable and stoppable roller table supported on drivable and stoppable running roller sets, it is achieved in a simple manner that the above described superimposed motion can be carried out while moving the roller table into or out of a storage location. Especially while relocating or restacking various large containers, it is not necessary to transitionally deposit the containers at temporary intermediate locations in other storage compartments, because the raisable and lowerable roller table can establish a desired order or arrangement of the containers, at the latest when the containers are on the conveyor device itself, for example, upon the release or delivery of the relocated containers.

According to a further particular embodiment of the invention, a control unit is provided in the storage rack conveyor device. The control unit controls the activation and stopping of the container support rollers of the roller table and of the running roller sets, and controls the raising and lowering of the roller table, dependent upon the preselected, targeted final storage positions of loaded or unloaded freight containers. In this manner a multi-storied highrise or underground storage facility is realized, which can be completely operated and controlled directly from the storage rack conveyor device without any end stops or shut-off switches. This achieves a considerable savings because auxiliary equipment such as end limit switches and other safety components are not necessary. As another result, it is no longer necessary to provide additional safety paths within the storage facility, extending in the directions of the horizontal and vertical motion of the storage conveyor device and the extension of the storage facility in a perpendicular direction. As a further advantage, the arrangement according to the invention requires no further control unit for an additional lift or hoist to the individual levels or floors of the storage facility, because such an additional lift or hoist is not necessary as described above. Further advantages, in addition to the elimination of a separate lift or hoist, are achieved by providing the fully self-sufficient conveyor device according to the invention. For example, while the carriage of the conveyor device travels horizontally along the alleyway, the platform of the conveyor device can also move vertically, so that the container being transported moves in a resultant diagonal direction to more quickly reach the selected destination storage location. Furthermore, while the container is being moved diagonally in this manner, the container may also be properly positioned on the conveyor device corresponding to the finally selected storage position within the selected storage location. Of course, these simultaneous movements in three dimensions can be carried out while storing, unstoring or relocating a container.

According to a further aspect of the invention, the present apparatus is also suitable for use in storage facilities, wherein a respective storage rack is arranged on each side of the open alleyway. In this way, the at least one roller table can serve storage locations or compartments in both storage racks by simply reversing its conveying direction by means of its at least two sets of running rollers. With such an arrangement, it is particularly simple to relocate or restack goods carriers from the right side storage rack to the left side storage rack at any desired storage level of either one of the two storage racks. Furthermore, this may be carried out without any additional auxiliary devices such as lifts, hoists, or conveyors.

Further according to the invention, the at least one roller table comprises several partial roller tables arranged sequentially one behind the other and interconnected with one another in an elastic manner. Such an arrangement assures that the roller table as well as the running roller sets are uniformly loaded while storing, unstoring or relocating goods being carried on a pallet that is weak or flexible to bending, such as an aircraft freight pallet, and also ensures that the pallet itself will be uniformly loaded. It is especially advantageous to arrange several such roller tables with several such running roller sets next to one another on a platform of a storage conveyor device, whereby any nonuniformities in the construction of the storage compartments can be compensated or evened out, without creating too high a loading on any one of the individual roller tables or the corresponding running roller sets cooperating with such a roller table.

In another particular embodiment, the invention provides that several of the above described conveyor tables or platforms can be arranged next to one another and over or under one another, for example, supported by a rotatable cross of support arms extending at 90° from one another. A respective roller table can be arranged on each one of the conveyor tables or platforms carried by such a rotatable cross. Each respective roller table can be constructed according to the above described embodiments or especially the following embodiments.

Instead of the embodiment described above in which a roller table comprises several partial roller tables interconnected elastically one behind another, together with the corresponding partial running roller sets, it is possible to provide a plurality of partial roller tables with an associated plurality of partial running rollers sets arranged one behind another on each conveyor table, wherein each partial roller table and each partial running roller set is provided with an electric power connection for an electric power supply arranged on the at least one conveyor table. By arranging a plurality of independent, successively arranged partial running roller sets with corresponding partial roller tables, according to the invention, the individual storage racks can be constructed with any desired storage depth independent of the width of the transfer alleyway provided for the storage rack conveyor device.

A particular embodiment includes several conveyor tables arranged next to one another and/or over one another, for example on a rotatable cross as described above, with a plurality of units respectively arranged on each conveyor table. Each unit comprises an autonomous conveying vehicle comprising partial running roller sets and at least one partial roller table. Especially in this embodiment, the object of the invention, namely being able to deposit a goods carrier at a desired final position in a storage compartment, can be carried out even when the storage depth of a storage compartment is a multiple of the travelling width of the vehicle, i.e. the conveying device, travelling in the alleyway. Hereby, additional new investments are not needed for the storage rack conveyor device, if the individual storage racks are to be enlarged in depth, i.e. by simply connecting additional storage rack units to the depth of an already existing storage rack.

Furthermore, the partial running roller sets and the partial roller tables can be coupled together depending upon the length of a container to be stored. In this manner, it is not necessary to temporarily or transitionally place a container into an intermediate storage location while relocating the container from a source storage location to a target storage location, even for the above described deep storage racks.

In further development of the above described embodiment, telescoping electric power rails can be provided between the power supply arranged on the table or tables and the power connections arranged on the partial roller sets and partial roller tables. Slip contacts are connected as power taps to the partial running roller sets and partial roller tables. By means of the above described embodiment, including telescoping power rails for transmitting electrical power, a conveyor device still having the original alleyway width can be used for the accurately positioned loading of even very deep storage compartments. By using telescoping power rails in this manner, it is possible to achieve practically any desired length extension of the power supply, while still maintaining a very compact arrangement, by simply providing a corresponding number of telescoping power rail elements. An alternative power transmission arrangement uses a spooled power cable, which is then simply pulled from the spool to the extent necessary as the conveying device extends into the storage compartment.

Instead of providing a power transmission arrangement in the form of telescoping power rails or an unspoolable power cable, a respective battery can be arranged on each partial roller set and each partial roller table, for a plurality of partial running roller sets and partial roller tables arranged one behind another on each conveyor table. This arrangement can be used in the embodiment having a single conveyor table or having a plurality of conveyor tables arranged next to and/or above one another, for example, on a rotatable cross with a 90° circumferential spacing between adjacent conveyor tables. Each conveyor table includes a charging station for the batteries. Thus, when the roller tables are retracted, the batteries are automatically recharged, while when the roller tables are extended, the batteries provide power for driving the partial running roller sets and the partial roller tables. This embodiment represents a significant simplification in view of the freedom of mobility of autonomous roller table units and further in view of the complete independence of the several autonomous units.

Respective drive motors are provided for the container support rollers of the roller tables or partial roller tables and for the running roller sets or partial running roller sets. The power supply and transmission arrangements described above, for example a central power source with telescoping power rails or a central battery charging station with autonomous batteries, are connected to the respective electric motors. Furthermore, the central drive and control unit is connected to the electric motors to control the operation of the motors. The motors may be connected to the corresponding rollers by any of various drive arrangements, including gear trains, belt drives, chain drives, cog drives, hydraulic drives, friction roller drives, tension cable drives and the like. Alternatively, an individual motor may be coupled through an appropriate drive train to drive several different rollers. Various brake arrangements may be provided to positively stop the rollers in response to control signals from the control unit. Such various arrangements are well understood by those skilled in the art and will be neither described in detail nor shown in the drawings herein.

In the above described inventive arrangement of several conveyor tables next to and/or respectively above one another, or as a so-called transfer star, it must simply be assured that the separate tables displaced by 90° from one another are slidable relative to one another in such a manner that a clearance height or free passage height is achieved while loading such a rotating cross conveyor device. Namely, the conveyor table located at a null position moves far enough downward while a table located 90° above the null position table is being loaded, or alternatively, the null position table moves upward to a sufficient extent when the table located 270° away from the null position table is being loaded, so as to provide the above mentioned clearance height or free passage height. The individual container can safely be transferred through the clearance height onto the conveyor table arranged at a location 270° displaced from the first mentioned null position table. In this manner, a compact structure is achieved for conveying containers corresponding to the width of the transfer alleyway into a multi-storied storage facility having a depth on each side of the transfer alleyway that is a four-fold multiple of the alleyway width.

It is a simple matter to even further expand the multi-storied storage facility, without any additional special measures, if containers of a smaller size are to be stored and if the individual tables comprise a plurality of autonomous units arranged one behind the other.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

FIGS. 1 to 4 show an example embodiment of the present invention as arranged in a multi-storied highrise storage facility. It should be understood that the invention can also be applied to a multi-storied underground storage facility, for example, arranged under a traffic surface or under a cargo handling and transloading surface. The invention can also be used in a storage facility located partly above ground and partly underground. All such variations are considered to fall within the scope of the appended claims.

Throughout all the figures, the same reference numbers are used consistently to refer to the same components. A building 1, such as a warehouse, houses a storage facility in which multi-storied storage racks 17 and 18 are arranged on both sides of an alleyway 3 called a running alley or transfer alley. The alleyway 3 runs along the centerline 2 of the building 1. A storage rack conveyor device 4 is arranged to be movable along the centerline 2 in the alleyway 3. More specifically, the conveyor device 4 is supported on rails 5 and 6, which extend along a traffic surface 7 in a horizontal direction parallel to the centerline 2. The conveyor device 4 comprises a carriage frame 8 to which are attached running wheels (not shown), which allow the conveyor device 4 to run horizontally along the pair of rails 5, 6. A vertical mast 9 is attached to the carriage frame 8 of the conveyor device. In the Example embodiment of FIG. 1, the mast 9 extends vertically through substantially the entire height of the building 1, and the upper end of the mast 9 is movably supported along a guide rail 10 near the roof of the building 1.

A conveyor table or platform 11 is vertically movably arranged on the vertical mast 9. As shown in a side view in FIG. 1 and a top view in FIG. 2, a roller table 12 is supported on the conveyor table 11 by means of running roller sets 13 and 14. A goods carrier, such as a freight container 16 is shown being carried on the roller table 12.

A drive and control unit 15 is arranged on the conveyor table 11 which drives and controls the horizontally directed motion of the running roller sets 13, 14 and of the roller table 12. The drive and control unit 15 can positively stop the motion of the running roller sets 13, 14 and the motion of the roller table 12 at a selected or predetermined position. The drive and control unit 15 is coupled to drive and control the respective rollers in any of various ways that are generally known in the art and are not shown or described in detail herein. Furthermore, the drive and control unit 15 can raise and lower the roller table 12 with respect to the conveyor table 11, by a mechanism described more particularly below with reference to FIG. 3.

As mentioned above, a storage rack 17, 18 is arranged on each side of the alleyway 3. Each storage rack 17, 18 has a plurality of storage levels or floors 17A to 17F and 18A to 18F. As will be described in greater detail below, each storage level 17A to 17F or 18A to 18F comprises a plurality of storage locations or compartments 19.

Near the ground level, each storage rack 17, 18 comprises a cargo handling or transloading platform 20, 21 having a stoppable or lockable roller floor 22, 23. Goods carriers, such as freight containers 16, can be transferred via these roller floors 22, 23 directly to or from the roller table 12 of the conveyor device 4. Alternatively, as shown at the left side of FIG. 1 under the storage rack 18, a raisable and lowerable scissors jack platform 24 having rollers on its upper platform can be arranged in place of or in addition to the roller floor 23 of the transloading platform 21. In this manner, a truck carrying freight containers can drive directly up to the scissors jack platform 24, which has been moved to its lower position, for example. The complete load of freight containers can be transferred from the truck to the rollers of the scissors jack platform 24, which then lifts the freight containers to the level of the cargo handling platform 21. At this time, the cargo containers can be transferred onto the roller table 12 by means of and under the control of the drive and control unit 15. Once loaded onto the roller table 12, the freight container or freight containers can be transferred to a selected storage location. Alternatively, the container or containers can be transferred via the roller table 12 directly onto the cargo handling or transloading platform 20, which, for example cooperates with a ramp conveyor (not shown), which serves to load the containers onto an aircraft.

Figure 2:
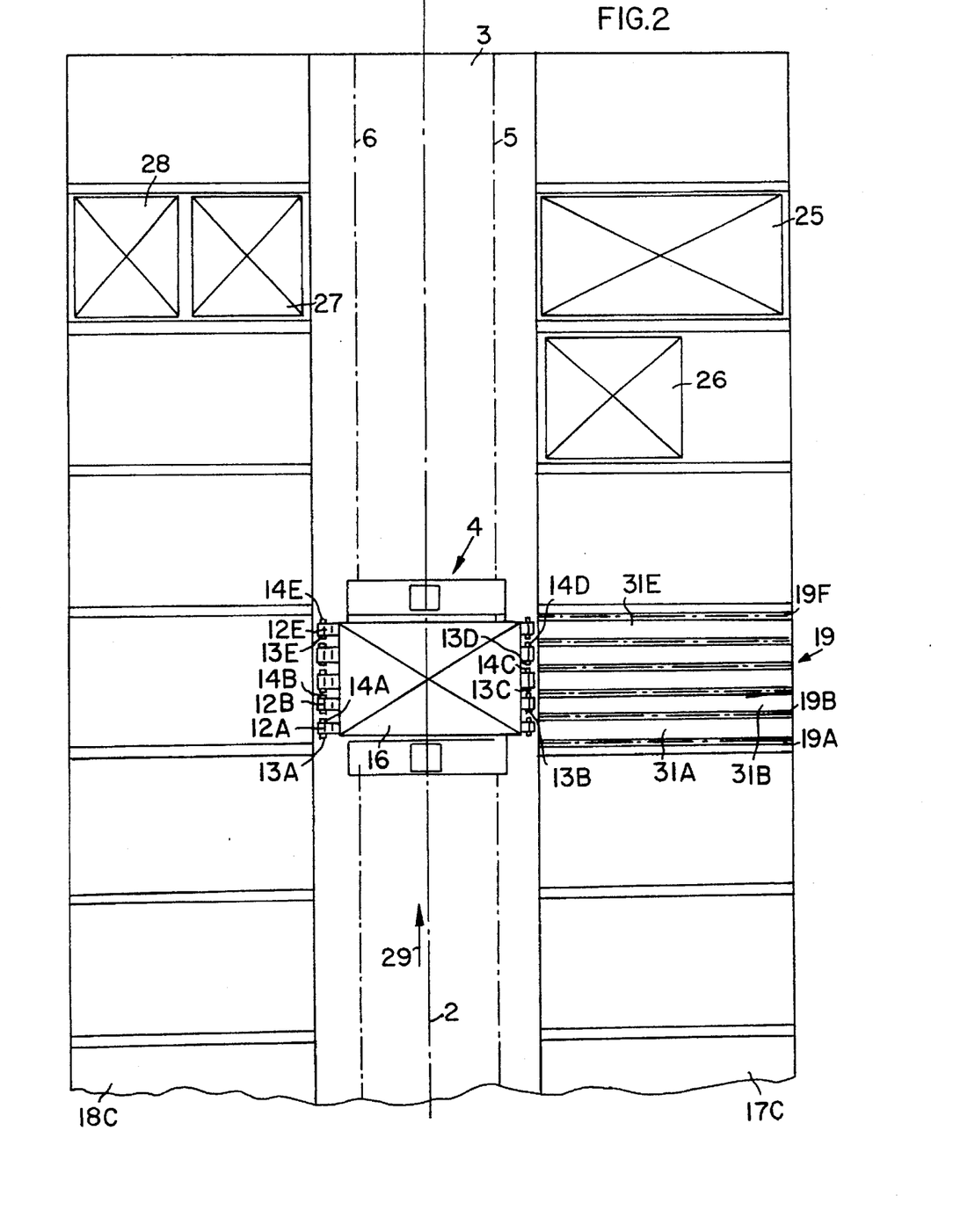
FIG. 2 is a schematic sectional top view of a single storage level of the storage facility shown in FIG. 1, showing several partial roller tables arranged next to one another on a conveyor table and showing a plurality of storage locations or compartments on the same storage level.

FIG. 2 is a schematic top view of a single storage level, for example, storage level 17C and 18C of the highrise storage facility. In each storage rack 17, 18 on this particular storage level 17C, 18C, a plurality of individual storage locations or compartments 19 are arranged next to one another in a direction parallel to the center line 2. Thereby, a depth dimension of each storage location or compartment 19 extends in a direction substantially perpendicular to the centerline 2. Each storage location or compartment 19 includes a group of support strips 19A to 19F arranged substantially at the floor of the storage level 17C, 18C, for receiving and supporting a freight container 16 thereon in a selected position within the storage compartment 19.

More specifically, in this example embodiment, the storage level 17C includes 10 individual storage locations 19, each comprising its own group of support strips 19A to 19F. In this example, each storage location 19 can be occupied by a single large container 25 or by two small containers 27 and 28, or by a single small container 26 placed at a desired position within the storage location or compartment 19. In this context, the small containers can have different dimensions, for example, corresponding to one half, one third, or one fourth of the length of the largest container 25 that can be stored in one of the storage locations 19.

Figure 1:
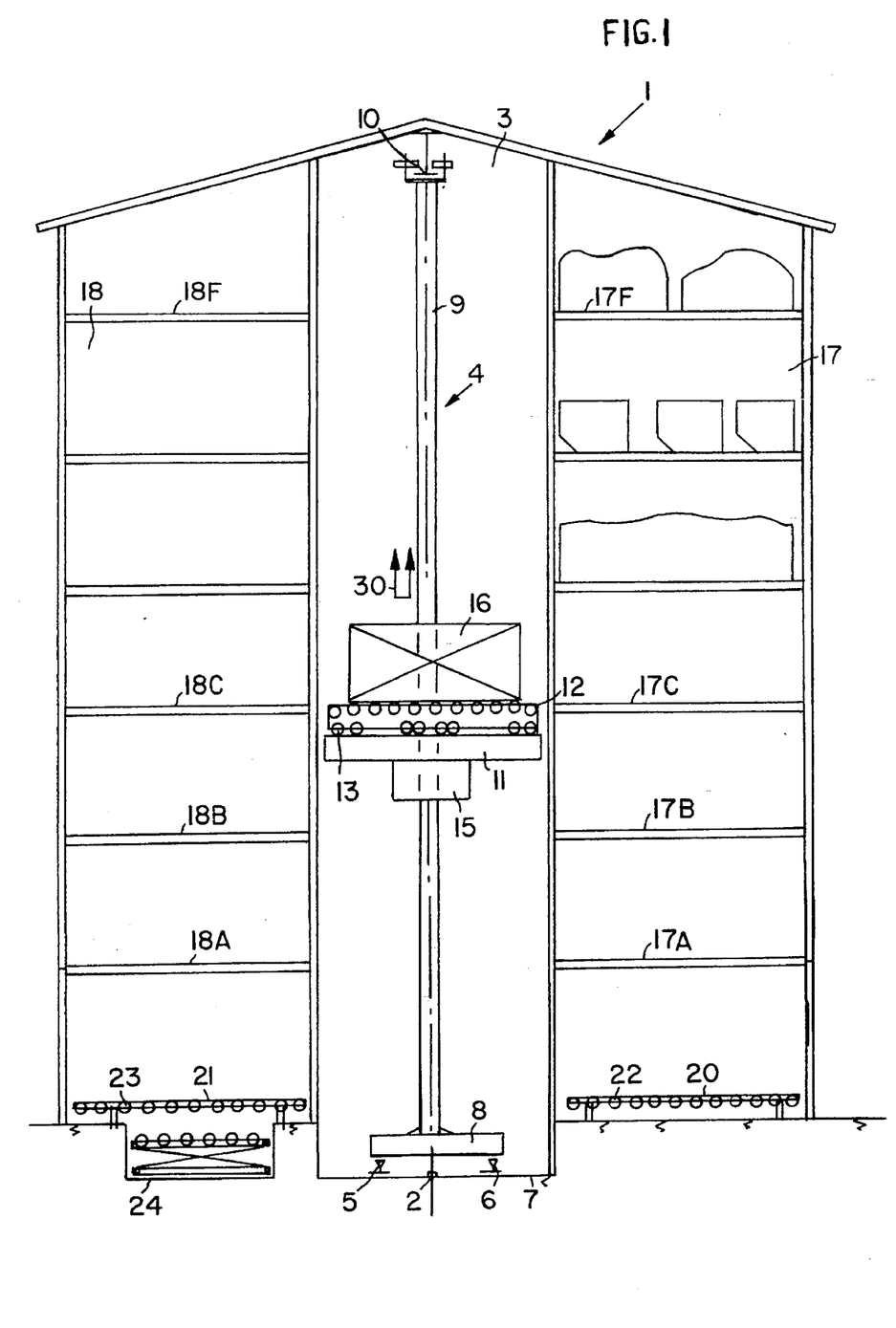
FIG. 1 is a schematic cross-sectional view of a highrise storage facility including two storage racks having multiple storage locations in multiple storage levels and a storage conveyor device according to the invention.

The method of loading containers into the storage compartments 19 comprising the respective groups of support strips 19A to 19F will now be described. First, a container 16 to be stored at a predetermined position in a preselected storage location 19 is loaded onto the roller table 12 of the storage conveyor device 4 at the cargo handling platform as described above. Then, the conveyor device 4 drives horizontally in the direction of arrow 29 along the rails 5, 6 provided in the alleyway 3 as shown in FIG. 2. Simultaneously with the horizontal movement, the conveyor table 11 of the conveyor device 4 moves vertically in the direction of double arrow 30 along the vertical mast 9 as shown in FIG. 1. In this way, the container 16 is moved diagonally upward and crosswise from the cargo handling platform to the selected storage compartment or storage location 19 comprising a group of support strips 19A to 19F.

At the latest when the conveyor table 11 reaches the selected storage compartment 19, the container 16 is moved into a proper preliminary position on the roller table 12 corresponding to a final desired position at which the container 16 is to be deposited on the support strips 19A to 19F within the selected storage location 19. To achieve this, the drive and control unit 15 causes the container 16 located on the roller table 12 to be lifted or correspondingly causes the roller table 12 to be lowered, and then appropriately moves the roller table 12 in a direction toward the storage rack 17 or toward the storage rack 18 as necessary, and then the container 16 is replaced on the roller table 12 to place the container 16 in the proper position on the roller table 12. Thus, the final position of the container 16 within the selected storage compartment 19 is already established and determined before the container 16 reaches its final storage location.

Next, the roller table 12 is driven to move the container 16 into the selected storage location 19. As shown in the top view of FIG. 2, the roller table 12 comprises a plurality of partial roller tables 12A to 12E, whereby each partial roller table 12A to 12E moves into a corresponding interspace 31A to 31E formed between respective ones of the support strips 19A to 19F. Each of the several partial roller tables 12A to 12E is supported by the associated running roller sets 13A to 13E and 14A to 14E which respectively run along two neighboring contact strips, such as 19A and 19B, for example, as described in greater detail below with reference to FIG. 3. Simultaneously, the portions of the partial roller tables 12A to 12E that have not yet been extended from the conveyor table 11 into the storage location 19, are supported by their respective partial running roller sets on the conveyor table 11.

Once the roller table 12, or rather the partial roller tables 12A to 12E have been extended into the storage location 19 and the container 16 has been moved into the preselected position within the storage location 19, i.e. above the group of support strips 19A to 19F, the drive and control unit 15 positively stops the roller table and the running roller sets. Then, the drive and control unit 15 lowers the roller table 12, i.e. lowers the plurality of partial roller tables 12A to 12E, so that the container 16 is lowered onto the support strips 19A to 19F. Then, the roller table 12, i.e. the partial roller tables 12A to 12E, are retracted on the partial running roller sets 13A to 13F and 14A to 14F back onto the conveyor table 11 of the storage conveyor device 4.

Next, the conveyor device 4 can be moved to another selected storage location, for example to pick up the small container 26 onto the roller table 12, substantially by reversing the steps described above. When the small container 26 has been picked up onto the roller table 12, the container 26 can immediately be positioned onto the roller table 12 in such a manner that the small container 27 can next be picked up in a prescribed position next to the container 26 on the roller table 12. Then, the two small containers 26 and 27 can be moved together to a prescribed position in a different storage location in a different storage level of the highrise storage facility, for example to relocate or restack the containers or to organize a batch of containers that are to be further transported together.

Figure 3:
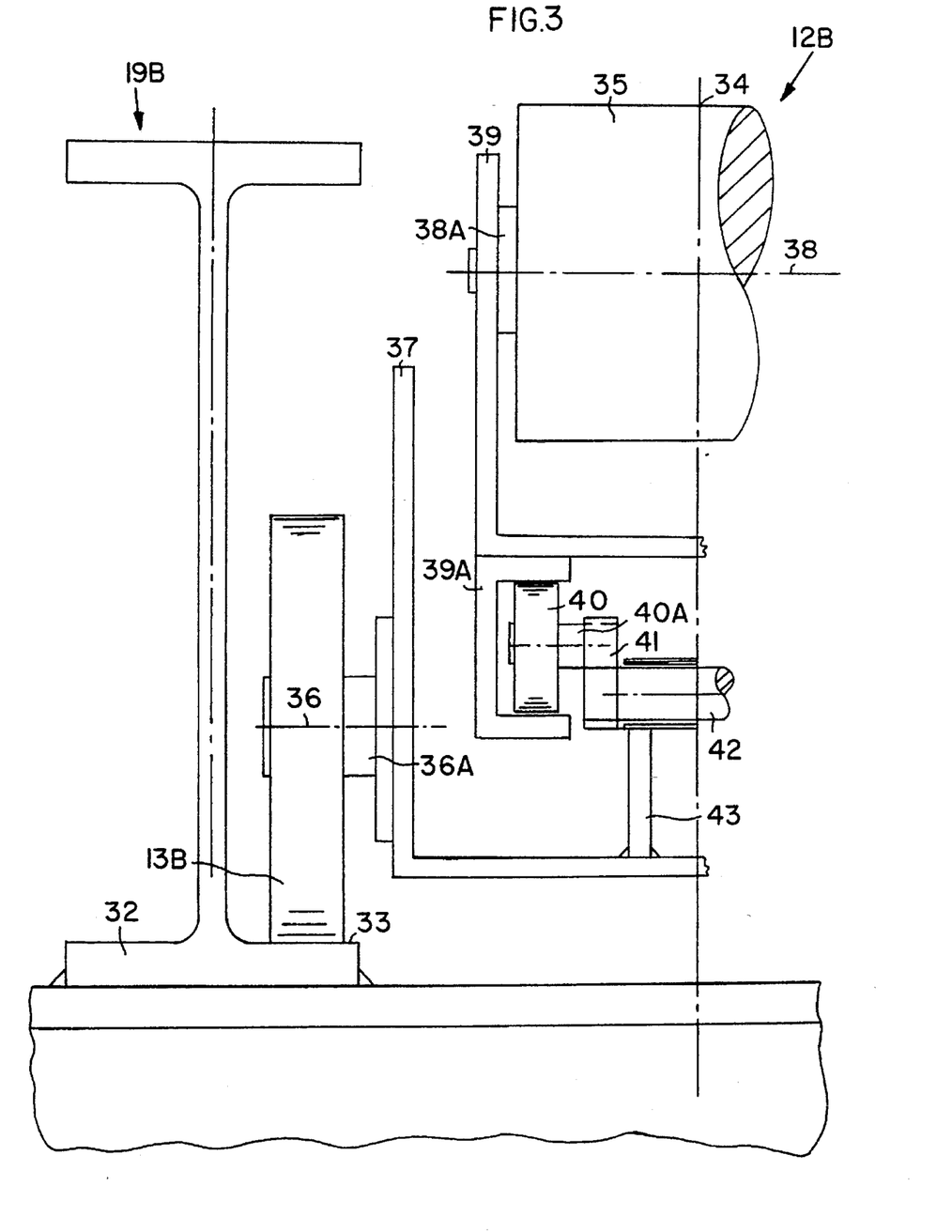
FIG. 3 is a schematic side view, on an enlarged scale, of a roller table including a running roller set.

In the enlarged detail view of FIG. 3 showing a portion of partial roller table 12B, it can be seen that support strip 19B is embodied as a double T-rail or I-beam 32. A running roller set 13B rolls along the inner flange 33 of the I-beam 32 forming the support strip 19B. For the sake of clarity in FIG. 3, only one running roller set 13B is shown. The arrangement of each partial running roller set 13A to 13E is similar to the generally depicted arrangement of roller set 13B. The running roller set 14B, is arranged symmetrically to the roller set 13B about the mid-plane 34 of the partial roller table 12B. The other ones of the roller sets 13A to 13E and 14A to 14E are similarly arranged on the other ones of the tables 12A to 12E. The partial roller table 12B comprises a plurality of container support rollers 35 arranged one behind the other to form the plane on which the container 16 is supported.

In the Example embodiment of FIG. 3, the running roller set 13B is connected to an auxiliary frame 37 via an axle shaft 36A at a rotation axis 36. The rollers 35 of the roller table 12 or partial roller table 12B are generally arranged within the auxiliary frame 37. More particularly, the rollers 35 are supported in a carrier frame 39 by means of axle shafts 38A arranged at the axes of rotation 38 of the rollers 35. In turn, the carrier frame 39 is connected to the auxiliary frame 37 through a mechanism that allows the carrier frame 39 and therewith the rollers 35 to be raised or lowered relative to the auxiliary frame 37 and thus relative to the support strip 19B.

This height adjustment mechanism includes an eccentric member 41 mounted on a drive shaft 42, which is rotatably supported on the auxiliary frame 37 by a support member 43. An axle shaft 40A is connected to the eccentric member 41 out of alignment or eccentrically with respect to the shaft 42. A cam or roller 40 is mounted on the shaft 40A. The carrier frame 39 is supported by a C-shaped rail or bracket 39A on the roller 40. This mechanism, particularly the shaft 42, can be driven and controlled by the drive and control unit 15 to raise or lower the rollers 35 of the roller table 12. In this manner, a container may be deposited onto or picked up from the group of support strips 19A to 19F at a selected position within a storage location 19.

Figure 4:
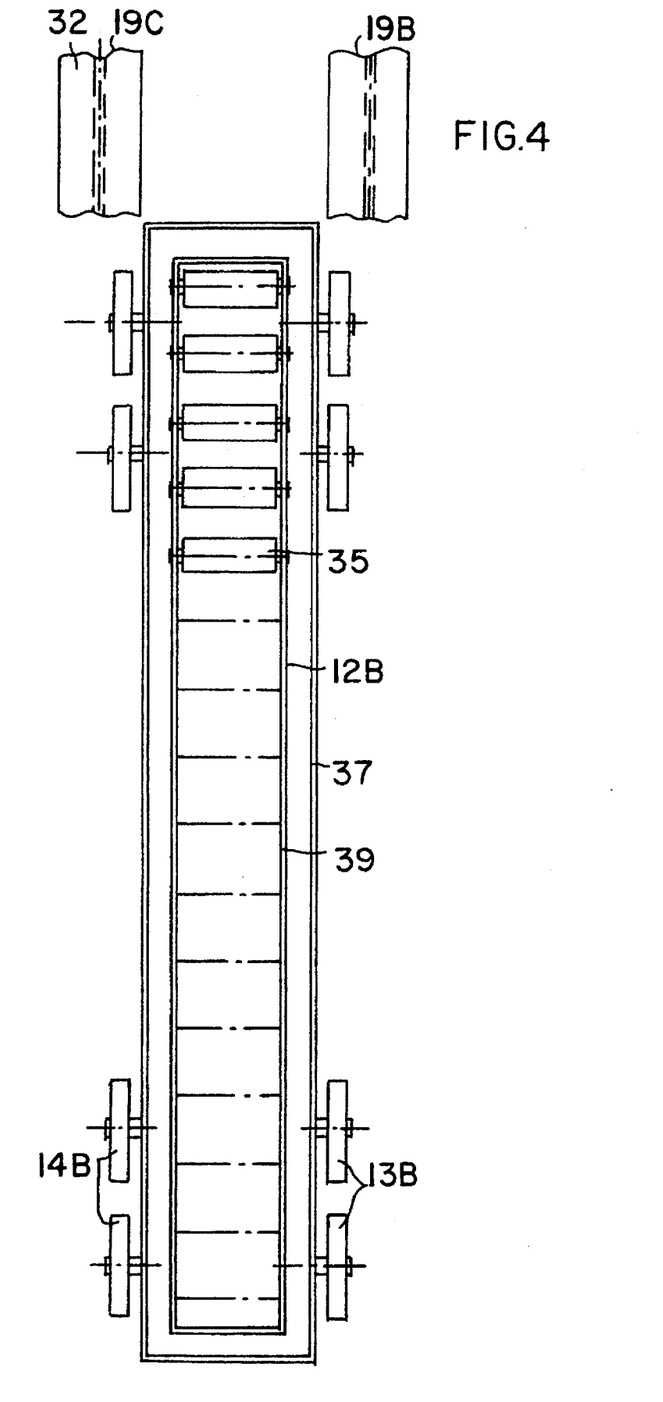
FIG. 4 is a schematic top view of the raisable and lowerable roller table and its supporting running roller sets.

FIG. 4 is a schematic top view of the partial roller table 12B including its container support rollers 35 and its running roller sets 13B, 14B which run along the rails 19B and 19C formed of I-beams 32.

Figure 5:
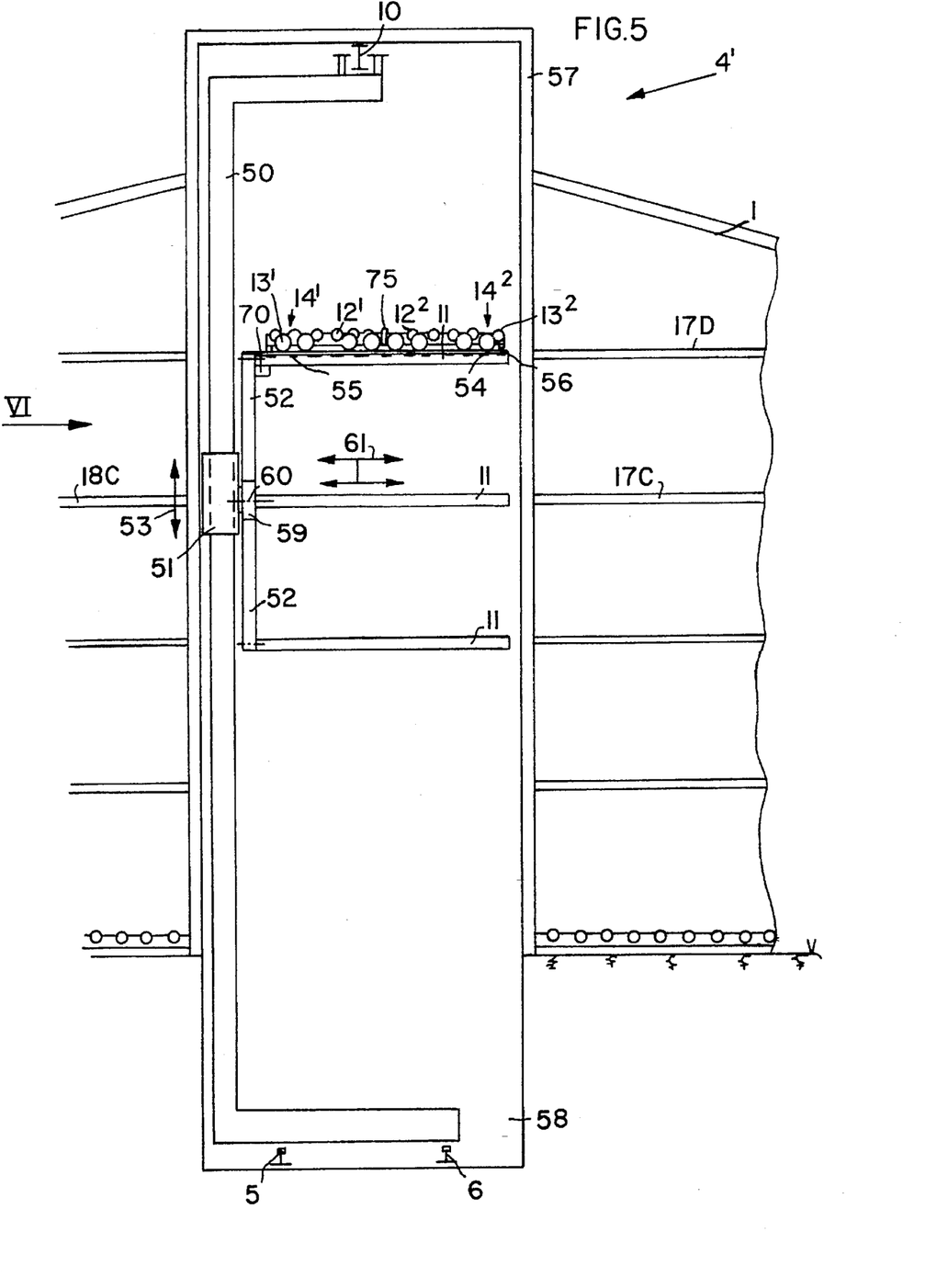
FIG. 5 is a schematic partial cross-sectional view of another multi-storied storage facility, with a conveyor device having four conveyor tables arranged on a rotatable cross at circumferential spacings of 90°.
Figure 6:
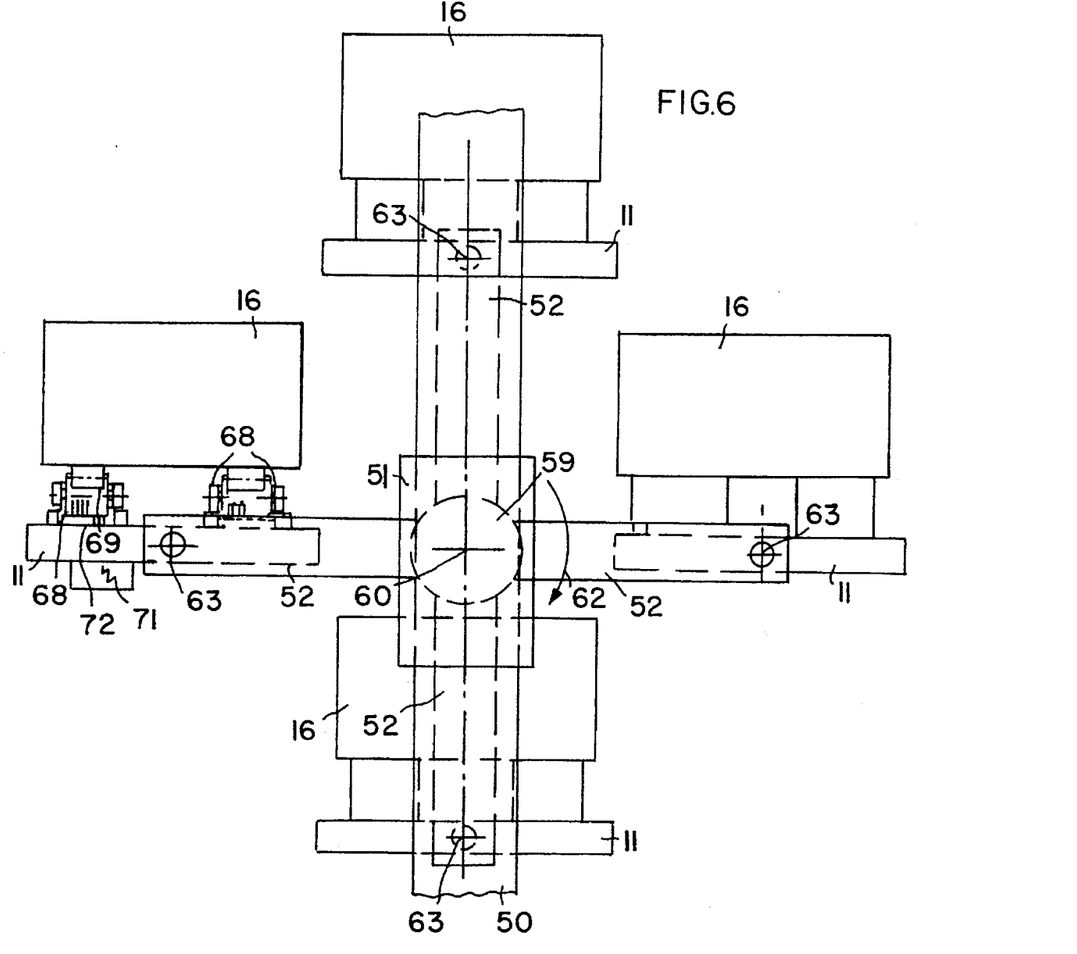
FIG. 6 is a schematic detail view of the arrangement of four conveyor tables on a four-armed rotatable cross, in the direction of arrow VI in FIG. 5.

Referring to FIGS. 5 and 6, a further particular embodiment according to the invention will now be described. The same components of the invention already described above bear the same reference numbers in FIGS. 5 and 6 and have a similar construction and function as described above. A cantilevered or C-shaped mast 50 of a conveyor device 4' is supported on and rides along rails 5 and 6 near the floor of a recessed pit 58 provided at the bottom of an alleyway in a storage building 1. Near the ceiling of a cupola 57 extending above the roof of the storage building 1, the mast 50 is supported by a guide rail 10. A sliding collar 51 is vertically movably arranged on the cantilevered mast 50. While the mast 50 moves horizontally along the rail 5, 6, the sliding collar 51 may simultaneously move vertically in the direction of the double headed arrow 53 to align a container to be stored with a selected storage compartment on a selected storage level, for example, 17C and 18C.

Referring to both FIGS. 5 and 6, four conveyor tables 11 are mounted at the ends of four respective support arms 52, which in turn are rotatably connected to the slide collar 51. FIG. 6 shows the conveyor device 4' in the view direction VI indicated in FIG. 5. The general arrangement of the rotating cross 59, which is rotatably mounted on a sliding collar 51, which in turn is vertically slidably mounted on a mast 50, is the same in the embodiments of FIGS. 5 and 6. Four conveyor tables 11 are mounted by shaft studs 63 respectively to the four arms 52 of the rotating cross 59. However, FIGS. 5 and 6 show slightly different drive power arrangements as will be described below.

As shown in FIG. 5, the vertical spacing between adjacent conveyor tables 11 corresponds to the vertical spacing between adjacent storage levels 17C, 17D. Similarly, the horizontal spacing between conveyor tables 11 can correspond to the horizontal spacing between next adjacent storage locations on a particular storage level, as can be understood from FIG. 6. In this manner, four different containers can be deposited at four different storage locations on three different storage levels simultaneously without rotating the cross-shaped support arms 52. Alternatively, four containers can be stored in sequence at a single storage location by depositing each successive container and then rotating the cross-shaped support arms 52 by 90°.

In this way, it is possible to more quickly load several containers in a single storage location that is deeper than the alleyway is wide. Each of the four conveyor tables can be loaded with a container or containers while the conveyor device is positioned at a cargo handling or loading platform. Then the conveyor device makes a single diagonal motion for bringing the conveyor tables to the selected storage location on a selected storage level. The containers located on the conveyor tables can be prepositioned on the tables so that each container can be deposited from the respective table in succession at the proper final position within the selected storage location, while merely rotating the cross-shaped arrangement to successively deposit the several containers at their prescribed positions in a row within the selected storage location. A restacking or relocation of containers within the storage facility is also possible in a simple manner using this cross-shaped arrangement.

The cupola 57 and the recessed pit 58 described above are so dimensioned that any size container located on the respective conveyor table 11 for being stored or unstored or relocated within the storage facility, has adequate clearance so that the rotating cross 59 formed by the support arms 52 can freely rotate, for example, in the direction of arrow 62 about the center of rotation 60 provided on the sliding collar 51.

The conveyor tables 11 respectively arranged on the four arms 52 of the rotating cross 59 can service the storage racks 17 and 18 in both directions as indicated by the double headed arrow 61 in FIG. 4, in a manner as described above.

Each conveyor table 11 may be embodied as described above, i.e. including at least one roller table 12 supported by at least one pair of running roller sets 13, 14 on the respective conveyor table 11. Alternatively, each conveyor table 11 can support a plurality of autonomous units each comprising a respective roller table 12 and respective running roller sets 13, 14. For example, FIG. 5 shows two such autonomous units, including roller table $12^1$ with roller sets $13^1$ and $14^1$ as well as roller table $12^2$ with roller sets $13^2$ and $14^2$ arranged one behind the other on the table 11. In this particular example embodiment, the autonomous units $12^1$, $13^1$, $14^1$ and $12^2$, $13^2$, $14^2$ are flexibly coupled together by articulated or elastic couplings 75, but are independently powered. Alternatively, the autonomous units may be completely independently arranged, without couplings between them. Each autonomous unit comprises slip contacts 54 and 55 that cooperate with telescoping power rails 56 arranged on the table 11. The telescoping power rails 56 are in turn coupled to a power and data supply 70. The slip contacts provide electrical power to roller drive motors arranged on each autonomous unit in a generally known manner.

In the particular embodiment of FIG. 6, the arrangement of rollers supporting a container 16 on the conveyor table 11 differs from the embodiment of FIG. 5. Specifically, a plurality of partial running roller sets 68, in a sufficient number corresponding to the total width of the container 16 to be transported, are rollingly supported on the conveyor table 11. Partial roller tables 69 are arranged next to one another on the table 11 and respectively cooperate with the partial running roller sets 68, to thereby form an autonomous or self-sufficient system. Several of such autonomous systems can be arranged on the table 11 one behind another in the direction toward the storage rack 17 or 18.

Batteries 72 are arranged in the autonomous systems 68, 69. A battery charging station 71 is provided on the table 11 for automatically charging the batteries 72 when the autonomous systems 68, 69 are retracted onto the table 11. Each autonomous system can include a drive motor (not shown) and an appropriate mechanism for driving the partial running roller sets 68 and the partial roller tables 69.

Although the invention has been described with reference to specific example embodiments, it will be appreciated that it is intended to cover all modifications and equivalents within the scope of the appended claims.

What is claimed is:

1. A method of conveying an item to be stored with respect to a storage rack having a plurality of storage levels with a plurality of storage locations on each storage level and a plurality of selectable storage positions within each storage location, using a conveyor device which is movable along the storage rack and which has a support member for carrying the item, the method comprising:

a) moving the conveyor device so that the support member is positioned at a selected target storage location;

b) moving the item on the support member into an optimized final position on the support member relatively corresponding to a selected target storage position at which the item is to be deposited in the selected target storage location;

c) moving the support member with the item thereon into the selected target storage location;

d) depositing the item from the optimized final position on the support member into the selected target storage position in the selected target storage location; and e) withdrawing the support member from the selected target storage location.

2. The method of claim 1, further comprising a preliminary step of picking up the item from a selected source storage position in a selected source storage location onto the support member in an initial position thereon corresponding to the source storage position at which the item had been located in the source storage location, and wherein said step b) comprises moving the item on the support member from the initial position into the optimized final position.

3. The method of claim 1, wherein said step b) of moving the item on the support member is carried out during said step a) of moving the conveyor device.

4. The method of claim 1, wherein said step b) of moving the item on the support member is carried out during said step c) of moving the support member.

5. The method of claim 1, wherein the storage rack has a plurality of support strips arranged at each of the storage locations and an alleyway arranged alongside the storage rack, wherein the conveyor device is arranged movably along the alleyway and among the storage levels, wherein the support member includes a conveyor platform and a roller table, wherein the roller table includes a plurality of driveable and stoppable support rollers, a plurality of driveable and stoppable running rollers that are arranged to be rollable along the conveyor platform and the support strips to support the roller table, and a height adjustable mechanism connecting the support rollers with the running rollers so that the support rollers are height adjustable relative to the conveyor platform and the support strips, and wherein said step a) comprises at least one movement selected from the group consisting of moving the conveyor device along the alleyway and moving the support member among the storage levels, said step b) comprises driving and stopping the support rollers as needed to move the item into the optimized final position on the support member, said step c) comprises driving the running rollers to roll along the conveyor platform and the support strips, said step d) comprises actuating the height adjustable mechanism to lower the support rollers below a supporting plane of the support strips, and said step e) comprises driving the running rollers to roll along the support strips and the conveyor platform in a direction opposite that of said step c).

6. The method of claim 5, wherein the conveyor device further includes a drive and control unit, and wherein said step b) comprises actuating the drive and control unit to drive and stop the support rollers, said step c) comprises actuating the drive and control unit to drive and stop the running rollers, and said step d) comprises actuating the drive and control unit to actuate a height adjustment of the height adjustable mechanism, dependent upon the selected target storage position and location of the item to be stored.

7. The method of claim 5, wherein the roller table includes a plurality of partial roller tables arranged adjacent one another and the running rollers include a plurality of partial running roller sets, wherein a respective partial running roller set is provided for each of the partial roller tables, and wherein said step c) comprises driving the partial running roller sets to roll along the support platform and the support strips and thereby to move the respective partial roller tables in succession one after another into the selected target storage location.

8. The method of claim 7, further comprising a step of coupling together a particular number of the partial roller tables in succession one after another depending on the length of the item that is to be conveyed and stored.

9. The method of claim 7, wherein the conveyor device further includes a power source arranged on the conveyor platform and respective power connectors for each of the partial roller tables, wherein said step c) further comprises providing power to each of the partial roller tables from the power source.

10. The method of claim 9, wherein the conveyor device further includes a telescopable power rail electrically connecting the power source with the power connectors, wherein the power connectors include slip contacts in sliding contact with the power rail, and wherein said step c) further comprises telescopically extending the power rail and sliding the slip contacts along the power rail while maintaining electrical contact therewith.

11. The method of claim 7, wherein the conveyor device further includes a battery charging station arranged on the conveyor platform, a respective battery provided for each of the partial roller tables, and a respective connector provided for each of the batteries, and said method further comprising electrically coupling the batteries with the charging station using the respective connectors when the partial roller tables are on the conveyor platform.

12. The method of claim 1, which is further for conveying the item with respect to a second storage rack arranged opposite and parallel to the first storage rack with an alleyway therebetween, wherein the support member is selectively movable in two opposite directions to enter storage locations in either of the first or second storage racks, and wherein said step a) further comprises selecting either the first or the second storage rack and selecting the target storage location in the selected storage rack, and said step c) comprises moving the support member in a selected one of the two opposite directions into the selected target storage location.

13. The method of claim 1, wherein the conveyor device includes a rail extending substantially horizontally in an alleyway arranged alongside the storage rack, a carriage arranged movably along the rail, a mast extending substantially vertically from the carriage, and a conveyor platform arranged movably along the mast, and wherein said step a) comprises at least one movement selected from the group consisting of moving the carriage along the rail and moving the conveyor platform along the mast.

14. The method of claim 13, wherein the conveyor device further includes a slide collar movably arranged on the mast, a plurality of platform support arms connected to the slide collar, and a plurality of the conveyor platforms respectively mounted on the support arms, and wherein said step a) further comprises positioning at least one selected conveyor platform in alignment with the selected target storage location.

15. The method of claim 14, wherein the platform support arms are rotatably arranged in a substantially vertical plane to extend radially from a center of rotation on the slide collar at uniform circumferential spacings from one another, and each of the conveyor platforms is rotatably mounted on a respective one of the support arms to always remain substantially horizontally level, and wherein said step a) further comprises rotating the platform support arms to bring the selected conveyor platform into alignment with the selected target storage location.

16. The method of claim 14, wherein said step a) further comprises simultaneously positioning all of the conveyor platforms in alignment with respective ones of a plurality of selected target storage locations.

17. A method of conveying a goods carrier with respect to a storage rack having a plurality of storage levels with a plurality of storage locations on each storage level, using a conveyor device which is movable along the storage rack and which has a goods carrier support member for carrying the goods carrier, wherein the storage rack has a plurality of support strips arranged at each of the storage locations and an alleyway arranged alongside the storage rack, wherein the conveyor device is arranged movably along the alleyway and among the storage levels, wherein the support member includes a conveyor platform and a roller table, wherein the roller table includes a plurality of driveable and stoppable support rollers, a plurality of driveable and stoppable running rollers that are arranged to be rollable along the conveyor platform and the support strips to support the roller table, and a height adjustable mechanism connecting the support rollers with the running rollers so that the support rollers are height adjustable relative to the conveyor platform and the support strips; the method comprising:

a) moving the conveyor device so that the support member is positioned at a selected target one of the storage locations;

b) positioning the goods carrier into a preliminary position on the support member, corresponding to a selected final position in which the goods carrier is to be placed in the selected target storage location;

c) moving the support member with the goods carrier thereon into the selected target storage location;

d) depositing the goods carrier at the final selected position in the selected target storage location; and e) withdrawing the support member from the selected target storage location;

wherein said step a) comprises at least one movement selected from the group consisting of moving the conveyor device along the alleyway and moving the support member among the storage levels, said step b) comprises driving and stopping the support rollers as needed to position the goods carrier at the preliminary position on the support member, said step c) comprises driving the running rollers to roll along the conveyor platform and the support strips, said step d) comprises actuating the height adjustable mechanism to lower the support rollers below a supporting plane of the support strips, and said step e) comprises driving the running rollers to roll along the support strips and the conveyor platform in a direction opposite that of said step c).

18. A method of conveying a goods carrier with respect to a storage rack having a plurality of storage levels with a plurality of storage locations on each storage level, using a conveyor device which is movable along the storage rack and which has a goods carrier support member for carrying the goods carrier, wherein the conveyor device includes a rail extending substantially horizontally in an alleyway arranged alongside the storage rack, a carriage arranged movably along the rail, a mast extending substantially vertically from the carriage, a slide collar movably arranged on the mast, a plurality of platform support arms connected to the slide collar, and a plurality of conveyor platforms respectively mounted on the support arms; the method comprising:

a) moving the conveyor device so that the support member is positioned at a selected target one of the storage locations;

b) positioning the goods carrier into a preliminary position on the support member, corresponding to a selected final position in which the goods carrier is to be placed in the selected target storage location;

c) moving the support member with the goods carrier thereon into the selected target storage location;

d) depositing the goods carrier at the final selected position in the selected target storage location; and e) withdrawing the support member from the selected target storage location;

wherein said step a) comprises at least one movement selected from the group consisting of moving the carriage along the rail and moving the conveyor platform along the mast, and comprises positioning at least one selected conveyor platform in alignment with a corresponding selected target storage location.

* * * * *